United States Patent
Faith et al.

(10) Patent No.: US 11,321,728 B2
(45) Date of Patent: May 3, 2022

(54) REDUCING LATENCY IN CROSS-DEVICE EXPERIENCES WITH CACHING AND HASHING

(71) Applicant: RetailMeNot, Inc., Austin, TX (US)

(72) Inventors: John Newman Faith, Austin, TX (US); Jagjit Singh Bath, Austin, TX (US); Eithan Zilkha, Austin, TX (US)

(73) Assignee: RetailMeNot, Inc., Los Angeles, CA (US)

(*) Notice: Subject to any disclaimer, the term of this patent is extended or adjusted under 35 U.S.C. 154(b) by 282 days.

(21) Appl. No.: 16/399,970

(22) Filed: Apr. 30, 2019

(65) Prior Publication Data

US 2019/0259049 A1   Aug. 22, 2019

Related U.S. Application Data

(63) Continuation of application No. 13/836,110, filed on Mar. 15, 2013, now abandoned.
(Continued)

(51) Int. Cl.
*G06Q 30/02* (2012.01)
*H04L 29/08* (2006.01)
*H04L 67/02* (2022.01)

(52) U.S. Cl.
CPC ......... *G06Q 30/0222* (2013.01); *G06Q 30/02* (2013.01); *G06Q 30/0225* (2013.01);
(Continued)

(58) Field of Classification Search
CPC .......... G06Q 30/0242; G06Q 30/0222; G06Q 30/02; G06Q 30/0225; G06Q 30/0239;
(Continued)

(56) References Cited

U.S. PATENT DOCUMENTS

| 6,185,541 B1* | 2/2001 | Scroggie ............... G06Q 20/12 705/14.23 |
| 6,754,662 B1* | 6/2004 | Li ......................... H04L 45/00 707/693 |

(Continued)

OTHER PUBLICATIONS

Notice of Allowance in related U.S. Appl. No. 14/199,588 dated Jun. 18, 2020 (9 pages).
(Continued)

*Primary Examiner* — Azam A Ansari
*Assistant Examiner* — Robert C Johnson
(74) *Attorney, Agent, or Firm* — Womble Bond Dickinson (US) LLP

(57) ABSTRACT

Provided is computer-implemented process, the process including: accessing an offers engine user profile associated with a user and an offers engine, the offers engine user profile comprising a plurality of attributes associated with customization of an offers interface, the offers interface configured to provide a plurality of merchant offers; receiving over a network from a first user device and a first session of the offers interface a modification to an attribute of the plurality of attributes of the offers-engine user profile; storing the modified attribute in the offers-engine user profile; receiving over a network a request to access the offers interface in a second session from a second user device; modifying, with a processor, the offers interface based on the modified attribute to produce a customized offers interface; and transmitting over a network the customized offers interface to the second user device for use in the second session.

26 Claims, 16 Drawing Sheets

Related U.S. Application Data

(60) Provisional application No. 61/707,527, filed on Sep. 28, 2012, provisional application No. 61/665,740, filed on Jun. 28, 2012, provisional application No. 61/658,408, filed on Jun. 12, 2012, provisional application No. 61/658,387, filed on Jun. 11, 2012, provisional application No. 61/658,404, filed on Jun. 11, 2012.

(52) U.S. Cl.
CPC ..... *G06Q 30/0239* (2013.01); *G06Q 30/0242* (2013.01); *G06Q 30/0255* (2013.01); *G06Q 30/0256* (2013.01); *G06Q 30/0267* (2013.01); *G06Q 30/0269* (2013.01); *H04L 67/02* (2013.01)

(58) Field of Classification Search
CPC ........... G06Q 30/0255; G06Q 30/0256; G06Q 30/0267; G06Q 30/0269; H04L 67/02
See application file for complete search history.

(56) References Cited

U.S. PATENT DOCUMENTS

| | | | | |
|---|---|---|---|---|
| 2004/0172400 | A1* | 9/2004 | Zarom | G06F 16/90339 |
| 2008/0215428 | A1* | 9/2008 | Ramer | G06Q 30/0269 |
| | | | | 705/14.53 |
| 2009/0030794 | A1 | 1/2009 | Scheflan et al. | |
| 2010/0121710 | A1 | 5/2010 | Chipman et al. | |
| 2011/0022312 | A1* | 1/2011 | McDonough | G06Q 40/00 |
| | | | | 701/533 |
| 2011/0153401 | A1 | 6/2011 | Jellema et al. | |
| 2012/0023107 | A1* | 1/2012 | Nachnani | G06F 16/24532 |
| | | | | 707/748 |
| 2017/0255988 | A1* | 9/2017 | Calio | G06F 16/24578 |

OTHER PUBLICATIONS

Partridge, Kurt and Bo Begole, "Pervasive Advertising; Chapter 4." Jul. 23, 2011, https://link.springer.com/content/pdf/10.1007%F978-0-85729-352-7_4.pdf (19 pages).

Office action in related Canadian application No. 2,876,007 dated Jun. 10, 2020 (4 pages).

Canadian Office Action dated Feb. 27, 2020 in Canadian Application No. 2,876,006 (6 pages).

Webarchive of CouponsHelper Tutorial https://web.archive.org/web/20120421032445/http://www.youtube.com/watch?v=SrYCmKdvzE4 Dec. 12, 2011 (4 pages).

Webarchive of CouponsHelper Firefox Addon https://web.archive.org/web/20120503055113/https://addons.mozilla.org/en-US/firefox/addon/couponshelper/, May 3, 2012 (6 pages).

CouponsHelper—Free Firefox Add On for Coupon Codes https://www.youtube.com/watch?v=TIL_44HRpk8, Jul. 11, 2011 (3 pages).

* cited by examiner

REDUCING LATENCY IN CROSS-DEVICE EXPERIENCES WITH CACHING AND HASHING

CROSS-REFERENCE TO RELATED APPLICATIONS

The present application is a continuation of U.S. patent application Ser. No. 13/836,110, filed 15 Mar. 2013, which is a non-provisional of, and thus claims the benefit of, each of the following U.S. provisional patent applications, each of which is hereby incorporated by reference for all purposes: provisional application 61/707,527, filed Sep. 28, 2012; provisional application 61/665,740, filed Jun. 28, 2012; provisional application 61/658,408, filed Jun. 12, 2012; provisional application 61/658,404, filed Jun. 11, 2012; and provisional application 61/658,387, filed Jun. 11, 2012.

BACKGROUND OF THE INVENTION

1. Field of the Invention

The present invention relates generally to merchant offers and, more specifically, to offer-discovery systems.

2. Description of the Related Art

Offer-discovery systems provide a service by which merchants inform customers of offers, for example deals (e.g., discounts, favorable shipping terms, or rebates) or coupons (e.g., printable coupons for in-store use or coupon codes for use online). Typically, these systems store information about offers from a relatively large number of merchants and provide an interface by which customers can identify offers in which the customer is likely to be interested. Merchants have found the deal-discovery systems to be a relatively effective form of marketing, as cost-sensitive consumers are drawn to such systems due to their relatively comprehensive listings of offers, and as a result, the number of offers listed on such systems has increased in recent years. One consequence of this increase is that users (e.g., prospective customers of the merchants) face an increasingly complex task of identifying relevant offers on offer-discovery systems and recalling information about the offer when making a purchase, potentially sometime in the future after first discovering the offer, and potentially in different instances of a browser window, a different application, or on a different computing device.

SUMMARY OF THE INVENTION

The following is a non-exhaustive listing of some aspects of the present techniques. These and other aspects are described in the following disclosure.

In some aspects, the present invention includes a computer-implemented process, the process including: accessing, by a processor, an offers engine user profile associated with a user and an offers engine, the offers engine user profile including a plurality of attributes associated with customization (e.g., personalization) of an offers interface, the offers interface being configured to provide a plurality of merchant offers; receiving over a network from a first user device during a first session of the offers interface, at a processor, a modification to an attribute of the plurality of attributes of the offers-engine user profile; storing the modified attribute in the offers-engine user profile; receiving over a network a request to access the offers interface during a second session from a second user device; modifying the offers interface based on the modified attribute to produce a customized offers interface; and transmitting over a network the customized offers interface to the second user device for use in the second session.

Some aspects include a non-transitory, computer-readable memory storing instructions that, when executed by a data processing apparatus, cause the data processing apparatus to effectuate operations including: obtaining a user profile of a user of an offers engine, the user profile having selections by the user related to offers; receiving from a first device of the user a request for an offers interface webpage; sending the first device the offers interface webpage; receiving from the first device a new selection related to offers; storing the new selection in the user profile; receiving from the user an application program interface request for offers data to be presented in a special-purpose native offers application on a mobile user device, the mobile user device being a different device from the first device; retrieving, from the user profile, the offers data, wherein the offers data includes the stored selection; and sending the offers data to the mobile user device.

Some aspects include a process of operating an offers interface on a user device, the process including: receiving, with an offers application executing on a mobile user device, a request for an offers engine user profile; presenting an interface to the user having inputs to select aspects of the user profile; receiving a user selection of saved offers of the user profile; sending a request to an offers engine for offers previously identified by the user; receiving responsive offers; and displaying the responsive offers.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
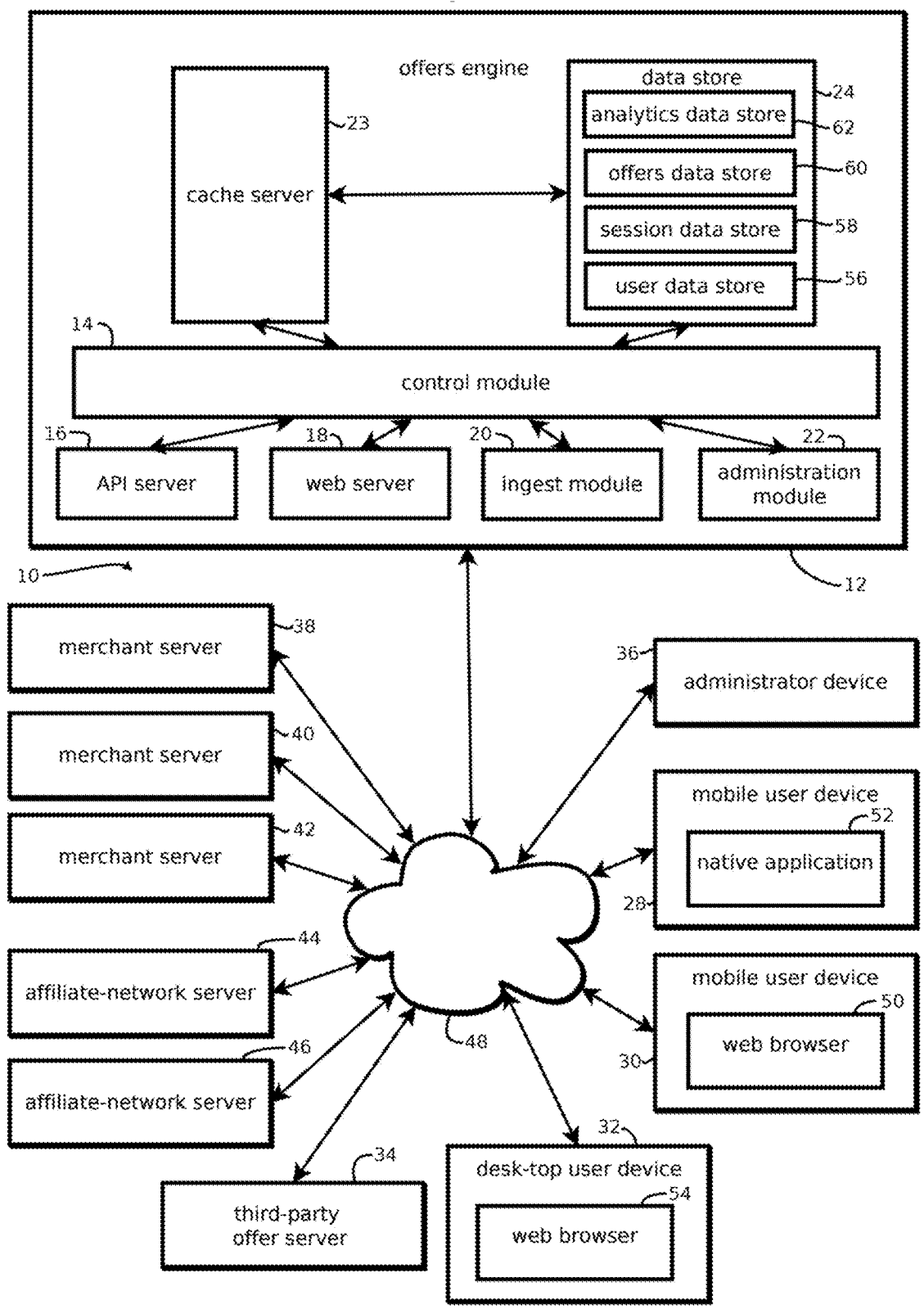
FIG. 1 illustrates an example of an offer-discovery system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 shows an embodiment of an offer-discovery system 10. The exemplary system 10 includes an offers engine 12 that, in some embodiments, is capable of reducing the burden on users attempting to identify offers relevant to them from among a relatively large pool of offers (e.g., more than 100, more than 1,000, or more than 10,000). To this end and others, the offers engine 12 maintains device-independent user profiles (or portions of user profiles) by which offers interfaces may be relatively consistently configured across multiple user devices with which the user interacts with the offers engine 12. Further, the offers engine 12, in some embodiments, includes a number of features expected to facilitate relatively quick identification of relevant offers by a user, features that include cached storage of data related to likely relevant offers, faceted presentation of offers by which users can select among offers within various categories, and a number of other techniques described below for assisting with offer identification. The offers engine 12 is also expected to facilitate relatively low operating costs by, in some embodiments, automating parts of the process by which offer related data is acquired from sources, such as affiliate networks merchants, administrators, or users, and automating parts of the process by which transaction data indicative of acceptance, settlement, or clearing of offers is obtained and processed.

These and other benefits are described in greater detail below, after introducing the components of the system 10 and describing their operation. It should be noted, however, that not all embodiments necessarily provide all of the benefits outlined herein, and some embodiments may provide all or a subset of these benefits or different benefits, as various engineering and cost tradeoffs are envisioned.

In the illustrated embodiment, the offers engine 12 includes a control module 14, an application program interface (API) server 16, a web server 18, an ingest module 20, an administration module 22, a data store 24, and a cache server 23. These components, in some embodiments, communicate with one another in order to provide the functionality of the offers engine 12 described herein. As described in greater detail below, in some embodiments, the data store 24 may store data about offers and users' interactions with those offers; the cache server 23 may expedite access to this data by storing likely relevant data in relatively high-speed memory, for example, in random-access memory or a solid-state drive; the web server 20 may serve webpages having offers interfaces by which users discover relevant offers; the API server 16 may serve data to various applications that process data related to offers; the ingest module 20 may facilitate the intake of data related to offers from affiliate networks, users, administrators, and merchants; and the administration module 22 may facilitate curation of offers presented by the API server 16 and the web server 18. The operation of these components 16, 18, 20, 22, 24, and 23 may be coordinated by the control module 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

Among other operations, the offers engine 12 of this embodiment presents offers to users; receives data from users about their interaction with the offers (for example, the user's favorite offers or offer attributes; statistics about the offers the user has identified, accepted, or otherwise provided data about; or the identity of other users with whom the user communicates about offers and the content of those communications; provided that users opt to have such data obtained); customizes the presentation of offers based on this received data; and facilitates the processing of compensation from merchants (either directly or through affiliate networks) as a result of users accepting (or taking a specific action, like clicking or viewing, in some embodiments or use cases) offers. This interaction with users may occur via a website viewed on a desktop computer, tablet, or a laptop of the user. And in some cases, such interaction occurs via a mobile website viewed on a smart phone, tablet, or other mobile user device, or via a special-purpose native application executing on a smart phone, tablet, or other mobile user device. Presenting and facilitating interaction with offers across a variety of devices is expected to make it easier for users to identify and recall relevant offers at the time the user is interested in those offers, which is often different from the time at which the user first discovers the offers. In particular, some embodiments allow users to store data indicative of offers relevant to that user using one device, such as a desktop computer in the user's home, and then view those offers at a later time, such as on a native mobile application when in a retail store.

To illustrate an example of the environment in which the offers engine 12 operates, the illustrated embodiment of FIG. 1 includes a number of components with which the offers engine 12 communicates: mobile user devices 28 and 30; a desk-top user device 32; a third party server 34; an administrator device 36; merchant servers 38, 40, and 42; and affiliate-network servers 44 and 46. Each of these devices communicates with the offers engine 12 via a network 48, such as the Internet or the Internet in combination with various other networks, like local area networks, cellular networks, or personal area networks.

The mobile user devices 28 and 30 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of the mobile user devices 28 and 30 may store instructions that when executed by the associated processor provide an operating system and various applications, including a web browser 50 or a native mobile application 52. The native application 52, in some embodiments, is operative to provide an offers interface that communicates with the offers engine 12 and facilitates user interaction with data from the offers engine 12. Similarly, the web browser 50 may be configured to receive a website from the offers engine 12 having data related to deals and instructions (for example, instructions expressed in JavaScrip™) that when executed by the browser (which is executed by the processor) cause the mobile user device to communicate with the offers engine 12 and facilitate user interaction with data from the offers engine 12. The native application 52 and the web browser 50, upon rendering a webpage from the offers engine 12, may generally be referred to as client applications of the offers engine 12, which in some embodiments may be referred to as a server. Embodiments, however, are not limited to client/server architectures, and the offers engine 12, as illustrated, may include a variety of components other than those functioning primarily as a server.

The desk-top user device 32 may also include a web browser 54 that serves the same or similar role as the web browser 50 in the mobile user device 30. In addition, the desk-top user device 32 may include a monitor; a keyboard; a mouse; memory; a processor; and a tangible, non-transitory, machine-readable memory storing instructions that when executed by the processor provide an operating system and the web browser.

Third-party offer server 34 may be configured to embed data from the offers engine 12 in websites or other services provided by the third-party offer server 34. For example, third-party offer server 34 may be a server of a social networking service upon which users post comments or statistics about offers with which the user has interacted, or the users may use the offer server 34 to recommend offers to others or identify offers to avoid. In another example, third-party offer server 34 may include various services for publishing content to the Web, such as blogs, tweets, likes, dislikes, ratings, and the like. In another example, third-party offer server 34 provides services by which third-parties curate offers hosted by the offers engine 12.

Merchant servers 38, 40, and 42 host websites or other user accessible content interfaces by which users can accept offers hosted by the offers engine 12. In some embodiments, and in some use cases, the merchant servers 38, 40, and 42 host retail websites that present a plurality of items for sale by the merchant, a subset of which may include items to which offers apply, thereby generally making the item for sale more desirable to cost-sensitive consumers than under the terms presented by the merchant in the absence of the offer. For example, the offers may include free or discounted shipping, a discounted price, a bulk discount, a rebate, a referral award, or a coupon, such as a coupon acceptable by presenting a coupon code during checkout on the merchant website, or a printable or displayable coupon (e.g., on the screen of a mobile device) for in-store use, the printable or otherwise displayable coupon having, in some cases, a machine readable code (e.g., a bar code or QR code for display and scanning, or a code passed via near-field communication or Bluetooth™). In some embodiments, the merchant website includes a checkout webpage having an interface for the user to enter payment information and a coupon code, and the merchant website (either with logic on the client side or the server-side) may validate the coupon code entered by the user and, upon determining that the coupon code is valid, adjust the terms presented to the user for acceptance in accordance with the offer.

Some merchants may limit the number of uses of a given coupon, limit the duration over which the coupon is valid, or apply other conditions to use of the coupon, each of which may add to the burden faced by users seeking to find valid coupons applicable to an item the user wishes to purchase. As noted above, some embodiments of the offers engine 12 are expected to mitigate this burden.

Further, in some embodiments, the merchant servers 38, 40, and 42 provide data about offers to the offers engine 12 or (i.e., and/or, as used herein, unless otherwise indicated) data about transactions involving offers. In use cases in which the operator of the offers engine 12 has a direct affiliate-marketing relationship with one of the merchants of the merchant servers 38, 40, or 42, the transaction data may provide the basis for payments by the merchant directly to the operator of the offers engine 12. For example, payments may be based on a percentage of transactions to which offers were applied, a number of sales to which offers were applied, or a number of users who viewed or selected or otherwise interacted with an offer by the merchant.

Affiliate-network servers 44 and 46, in some embodiments and some use cases, are engaged when the entity operating the offers engine 12 does not have a direct affiliate-marketing relationship with the merchant making a given offer. In many affiliate marketing programs, merchants compensate outside entities, such as third-party publishers, for certain activities related to sales by that merchant and spurred by the outside entity. For example, in some affiliate marketing programs, merchants compensate an affiliate, such as the entity operating the offers engine 12, in cases in which it can be shown that the affiliate provided a given coupon code to a given user who then used that coupon code in a transaction with the merchant. Demonstrating this connection to the merchant is one of the functions of the affiliate-networks.

Affiliate-networks are used, in some use cases, because many coupon codes are not affiliate specific and are shared across multiple affiliates, as the merchant often desires the widest distribution of a relatively easily remembered coupon code. Accordingly, in some use cases, the merchant, affiliate network, and affiliate cooperate to use client-side storage to indicate the identity of the affiliate that provided a given coupon code to a user. To this end, in some embodiments, when a webpage offers interface is presented by the offers engine 12 in the web browsers 50 or 54, that webpage is configured by the offers engine 12 to include instructions to engage the affiliate network server 44 or 46 when a user selects an offer, for example, by clicking on, touching, or otherwise registering a selection of an offer. The website provided by the offers engine 12 responds to such a selection by, in some embodiments, transmitting a request to the appropriate affiliate-network server 44 or 46 (as identified by, for example, an associated uniform resource locator (URL) in the webpage) for a webpage or portion of a webpage (e.g., browser-executable content). The request to the affiliate-network server may include (e.g., as parameters of the URL) an identifier of the affiliate, the offer, and the merchant, and the returned content from the affiliate-network server may include instructions for the web browser 50 or 54 to store in memory (e.g., in a cookie, or other form of browser-accessible memory, such as a SQLite database or in a localStorage object via a localStorage.setItem command) an identifier of the affiliate that provided the offer that was selected.

The webpage from the offers engine 12 (or the content returned by the affiliate network server 44 or 46) may further include browser instructions to navigate to the website served by the merchant server 38, 40, or 42 of the merchant associated with the offer selected by the user, and in some cases to the webpage of the item or service associated with the offer selected by the user. When a user applies the offer, for example by purchasing the item or service or purchasing the item or service with the coupon code, the merchant server 38, 40, or 42 may transmit to the user device upon which the item was purchased browser instructions to request content from the affiliate network server 44 or 46, and this requested content may retrieve from the client-side memory the identifier of the affiliate, such as the operator of the offers engine 12, who provided the information about the offer to the user. The affiliate network may then report to the merchant the identity of the affiliate who should be credited with the transaction, and the merchant may compensate the affiliate (or the affiliate network may bill the merchant, and the affiliate network may compensate the affiliate), such as the operator of the offers engine 12. Thus, the affiliate network in this example acts as an intermediary, potentially avoiding the need for cross-domain access to browser memory on the client device, a feature which is generally not supported by web browsers for security reasons. (Some embodiments may, however, store in client-side browser-accessible memory an identifier of the affiliate upon user selection of the offer, with this value designated as being accessible via the merchant's domain, and provide the value to the merchant upon a merchant request following acceptance of the offer, without passing the identifier through an affiliate network, using a browser plug-in for providing cross-domain access to browser memory or a browser otherwise configured to provide such access.)

A similar mechanism may be used by the native application 52 for obtaining compensation from merchants. In some embodiments, the native application 52 includes or is capable of instantiating a web browser, like the web browser 50, in response to a user selecting an offer presented by the native application 52. The web browser instantiated by the native application 52 may be initialized by submitting the above-mentioned request for content to the affiliate-network server 44 or 46, thereby storing an identifier of the affiliate (i.e., the entity operating the offers engine 12 in this example) in client-side storage (e.g., in a cookie, localStorage object, or a database) of the mobile user device 28, and thereby navigating that browser to the merchant website. In other use cases, the operator of the offers engine 12 has a direct relationship with the merchant issuing the offer, and the selection of an offer within the native application 52 or the desktop or mobile website of the offers engine 12 (generally referred to herein as examples of an offer interface) may cause the user device to request a website from the associated merchant with an identifier of the affiliate included in the request, for example as a parameter of a URL transmitted in a GET request to the merchant server 38, 40, or 42 for the merchant's web site.

Administrator device 36 may be a special-purpose application or a web-based application operable to administer operation of the offers engine 12, e.g., during use by employees or agents of the entity operating the offers engine 12. In some embodiments, the administration module 22 may communicate with the administrator device 36 to present an administration interface at the administrator device 36 by which an administrator may configure offers interfaces presented to users by the offers engine 12. In some embodiments, the administrator may enter offers into the offers engine 12; delete offers from the offers engine 12; identify offers for prominent placement within the offers interface (e.g., for initial presentation prior to user interaction); moderate comments on offers; view statistics on offers, merchants, or users; add content to enhance the presentation of offers; or categorize offers.

Thus, the offers engine 12, in some embodiments, operates in the illustrated environment by communicating with a number of different devices and transmitting instructions to various devices to communicate with one another. The number of illustrated merchant servers, affiliate network servers, third-party servers, user devices, and administrator devices is selected for explanatory purposes only, and embodiments are not limited to the specific number of any such devices illustrated by FIG. 1.

The offers engine 12 of some embodiments includes a number of components introduced above that facilitate the discovery of offers by users. For example, the illustrated API server 16 may be configured to communicate data about offers via an offers protocol, such as a representational-state-transfer (REST)-based API protocol over hypertext transfer protocol (HTTP). Examples of services that may be exposed by the API server 18 include requests to modify, add, or retrieve portions or all of user profiles, offers, or comments about offers. API requests may identify which data is to be modified, added, or retrieved by specifying criteria for identifying records, such as queries for retrieving or processing information about particular categories of offers, offers from particular merchants, or data about particular users. In some embodiments, the API server 16 communicates with the native application 52 of the mobile user device 28 or the third-party offer server 34.

The illustrated web server 18 may be configured to receive requests for offers interfaces encoded in a webpage (e.g. a collection of resources to be rendered by the browser and associated plug-ins, including execution of scripts, such as JavaScript™, invoked by the webpage). In some embodiments, the offers interface may include inputs by which the user may request additional data, such as clickable or touchable display regions or display regions for text input. Such inputs may prompt the browser to request additional data from the web server 18 or transmit data to the web server 18, and the web server 18 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). The web server 18 may communicate with web browsers, such as the web browser 50 or 54 executed by user devices 30 or 32. In some embodiments, the webpage is modified by the web server 18 based on the type of user device, e.g., with a mobile webpage having fewer and smaller images and a narrower width being presented to the mobile user device 30, and a larger, more content rich webpage being presented to the desk-top user device 32. An identifier of the type of user device, either mobile or non-mobile, for example, may be encoded in the request for the webpage by the web browser (e.g., as a user agent type in an HTTP header associated with a GET request), and the web server 18 may select the appropriate offers interface based on this embedded identifier, thereby providing an offers interface appropriately configured for the specific user device in use.

The illustrated ingest module 20 may be configured to receive data about new offers (e.g., offers that are potentially not presently stored in the data store 24), such as data feeds from the affiliate network servers 44 and 46, identifications of offers from user devices 28, 30, or 32, offers identified by third-party offer server 34, offers identified by merchant servers 38, 40, or 42, or offers entered by an administrator via the administrator device 36. In some embodiments, the ingest module 20 may respond to receipt of a record identifying a potentially new offer by querying the data store 24 to determine whether the offer is presently stored. Upon determining that the offer is not presently stored by the data store 24, the ingest module 20 may transmit a request to the data store 24 to store the record. In some cases, the data about new offers may be an affiliate data-feed from an affiliate network containing a plurality of offer records (e.g., more than 100), each record identifying offer terms, a merchant, a URL of the merchant associated with the offer, a product description, and an offer identifier. The ingest module 22 may periodically query such data-feeds from the affiliate-network servers 44 or 46, parse the data-feeds, and iterate through (or map each entry to one of a plurality of processes operating in parallel) the records in the data-feeds. Bulk, automated processing of such data-feeds is expected to lower operating costs of the offers engine 12.

The administration module 22 may provide an interface by which an administrator operating the administrator device 36 curates and contextualizes offers. For example, the administration module 22 may receive instructions from administrator that identify offers to be presented in the offer interface prior to user interaction with the offer interface, or offers to be presented in this initialized offers interface for certain categories of users, such as users having certain attributes within their user profile. Further, in some embodiments, the administration module 22 may receive data descriptive of offers from the administrator, such as URLs of images relevant to the offer, categorizations of the offer, normalized data about the offer, and the like.

The illustrated data store 24, in some embodiments, stores data about offers and user interactions with those offers. The data store 24 may include various types of data stores, including relational or non-relational databases, document collections, hierarchical key-value pairs, or memory images, for example. In this embodiment, the data store 24 includes a user data store 56, a session data store 58, an offers data store 60, and an analytics data store 62. These data stores 56, 58, 60, and 62 may be stored in a single database, document, or the like, or may be stored in separate data structures.

In this embodiment, the illustrated user data store 56 includes a plurality of records, each record being a user profile and having a user identifier, a list of offers (e.g., identifiers of offers) identified by the user as favorites, a list of categories of offers identified by the user as favorites, a list of merchants identified by the user as favorites, account information for interfacing with other services to which the user subscribes (e.g., a plurality of access records, each record including an identifier of a service, a URL of the service, a user identifier for the service, an OAuth access token credential issued by the service at the user's request, and an expiration time of the credential), a user password for the offers engine 12, a location of the user device or the user (e.g., a zip code of the user), and a gender of the user. In some embodiments, each user profile includes a list of other users identified by the user of the user profile as being people in whose commentary on, or curation of, offers the user is interested, thereby forming an offers-interest graph. In some embodiments, users have control of their data, including what is stored and who can view the data, and can choose to opt-in to the collection and storage of such user data to improve their experience with the offers engine 12.

In this embodiment, the session data store 58 stores a plurality of session records, each record including information about a session a given user is having or has had with the offers engine 12. The session records may specify a session identifier, a user identifier, and state data about the session, including which requests have been received from the user and what data has been transmitted to the user. Session records may also indicate the IP address of the user device, timestamps of exchanges with the user device, and a location of the user device (e.g., retail store or aisle in a retail store in which the user device is located).

The illustrated offers data store 60, in some embodiments, includes a plurality of offer records, each offer record may identify a merchant, offers by that merchant, and attributes of the relationship with the merchant, e.g., whether there is a direct relationship with the merchant by which the merchant directly compensates the operator of the offers engine 12 or whether the merchant compensates the operator of the offers engine 12 via an affiliate network and which affiliate network. The offers by each merchant may be stored in a plurality of merchant-offer records, each merchant-offer record may specify applicable terms and conditions of the offer, e.g., whether the offer is a discount, includes free or discounted shipping, requires purchase of a certain number of items, is a rebate, or is a coupon (which is not to suggest that these designations are mutually exclusive). In records in which the offer is a coupon, the record may further indicate whether the coupon is for in-store use (e.g. whether the coupon is associated with a printable image for presentation at a point-of-sale terminal, a mobile device-displayable image, or other mediums) or whether the coupon is for online use and has a coupon code, in which case the coupon code is also part of the merchant-offer record. The merchant-offer records may also include an expiration date of the offer, comments on the offer, rankings of the offer by users, a time at which the offer was first issued or entered into the offers engine 12, and values (e.g., binary values) indicating whether users found the offer to be effective, with each value or ranking being associated with a timestamp, in some embodiments. The values and rankings may be used to calculate statistics indicative of the desirability of the offer and likely success of accepting the offer. The timestamps associated with the values, rankings, and time of issuance or entry into the offers engine 12 may also be used to weight rankings of the offer, with older values being assigned less weight than newer values and older offers being ranked lower than newer offers, all other things being equal, as many offers expire or have a limited number of uses.

The illustrated analytics data store 62 may store a plurality of records about historical interactions with the offers engine 12, such as aggregate statistics about the performance of various offers. In some embodiments, the analytics data store 62 stores a plurality of transaction records, each transaction record identifying an offer that was accepted by a user at a merchant, the merchant, the time of presentation of the offer to the user, and an indicator of whether the merchant has compensated the entity operating the offers engine 12 for presentation of the offer to the user. Storing and auditing these transaction records is expected to facilitate relatively accurate collection of payments owed by merchants and identification of future offers likely to lead to a relatively high rates of compensation for prominent presentation based on past performance of offers having similar attributes.

The cache server 23 stores a subset of the data in the data store 24 that is among the more likely data to be accessed in the near future. To facilitate relatively fast access, the cache server 23 may store cached data in relatively high speed memory, such as random access memory or a solid-state drive. The cached data may include offers entered into the offers engine 12 within a threshold period of time, such as offers that are newer than one day. In another example, the cache data may include offers that are accessed with greater than a threshold frequency, such as offers that are accessed more than once a day, or offers accessed within the threshold, such as offers accessed within the previous day. Caching such offer data is expected to facilitate faster access to offer data than systems that do not cache offer data.

The illustrated control module 14, in some embodiments, controls the operation of the other components of the offers engine 12, receiving requests for data or requests to add or modify data from the API server 16, the web server 18, the ingest module 20, and the administration module 22, and instructing the data store 24 to modify, retrieve, or add data in accordance with the request. The control module 14 may further instruct the cache server 23 to modify data mirrored in the cache server 23. In some embodiments, the cache server 23 may be updated hourly, and inconsistent data may potentially be maintained in the cache server 23 in order to conserve computing resources.

The illustrated components of the offers engine 12 are depicted as discrete functional blocks, but embodiments are not limited to systems in which the functionality described herein is organized as illustrated by FIG. 1. The functionality provided by each of the components of the offers engine 12 may be provided by software or hardware modules that are differently organized than is presently depicted, for example such software or hardware may be intermingled, broken up, distributed (e.g. within a data center or geographically), or otherwise differently organized. The functionality described herein may be provided by one or more processors of one or more computers executing code stored on a tangible, non-transitory, machine readable medium.

Figure 2:
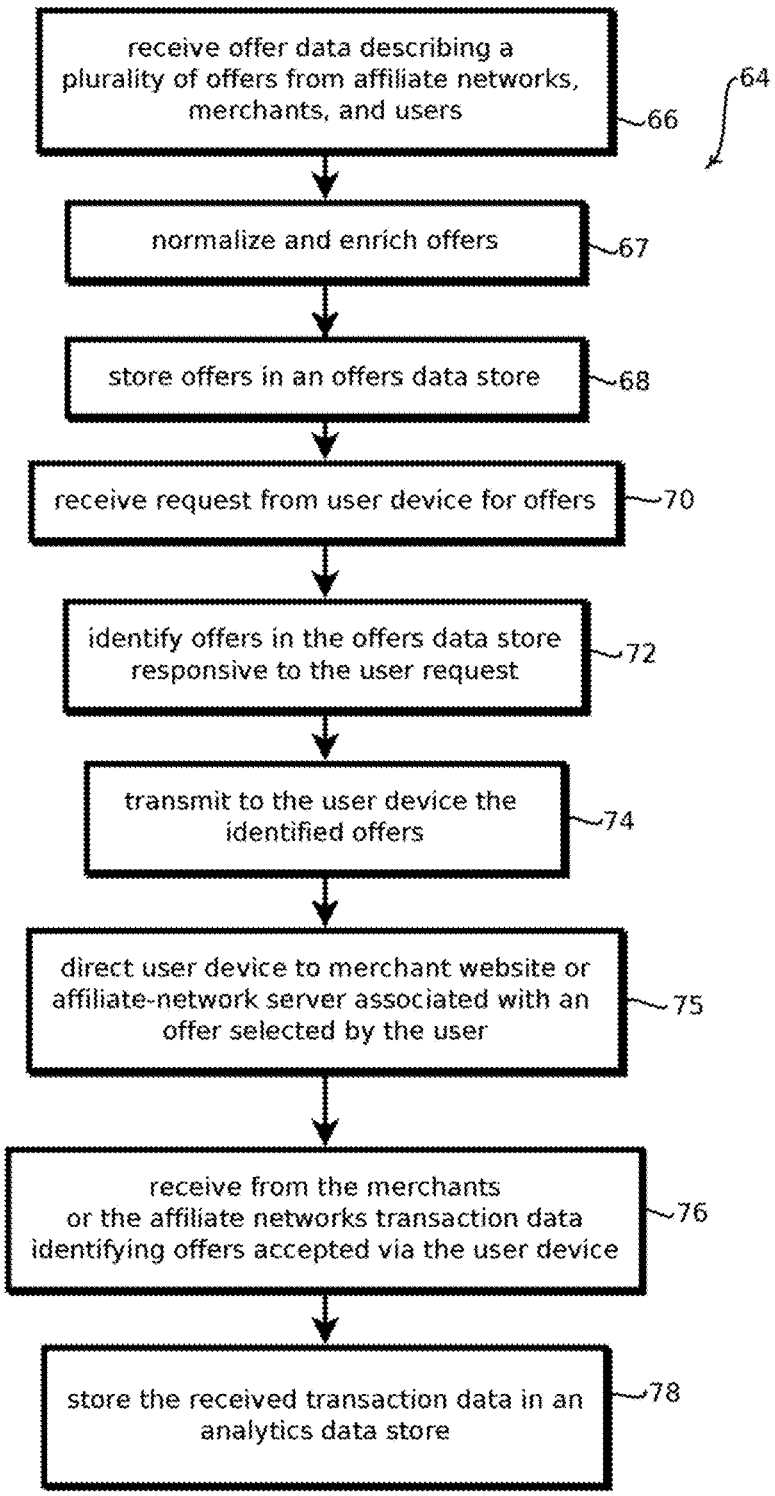
FIG. 2 illustrates an example of a process by which an offers engine in the offer-discovery system of FIG. 1, in some embodiments, obtains and processes data related to offers.

FIG. 2 is a flowchart of a process 64 for acquiring data related to offers within some embodiments of the offer engine 12 discussed above. In this embodiment, the process 64 begins with receiving offer data describing a plurality of offers from affiliate networks, merchants, and users, as illustrated by block 66. This step may be performed by the above-mentioned ingest module 20. As noted above, the received offer data may be received from one or all of these sources. The received offer data may be received via an offer interface by which users associated with these sources enter data about offers, or the received offer data may be received in a predefined format, such as a serialized data format, in an automatic data feed pushed or pulled periodically or in response to the availability of new data from affiliate networks or merchants. Receiving the offer data may include determining whether the offer data is redundant to offer data already received and normalizing the offer data.

The process 64, in some embodiments, includes normalizing and enriching the offer data. Normalizing may include normalizing field names of the data and normalizing the way in which dates are expressed, for example. Enriching may include associating images with the offers for presentation with the offers and adding metadata to the offers to assist users searching for offers.

Next, in the present embodiment, the received offer data is stored in an offer data store, as indicated by block 68. Storing the offer data in the offer data store may include identifying a merchant to which the offer pertains and storing the offer in a merchant-offer record associated with that merchant. Further, some embodiments may include inserting the offer in order in a sorted list of offers for relatively fast retrieval of offers using a binary search algorithm or other techniques to facilitate relatively quick access to data that has been preprocessed (e.g., using a prefix trie). In some embodiments, storing the received offer may further include updating hash tables by which the offer may be retrieved according to various parameters, each hash table being associated with one parameter and including a hash key value calculated based on the parameter and paired with an address of the offer. Such hash tables are expected to facilitate relatively fast access to a given offer as the need to iterate through potentially all offers meeting certain criteria may be potentially avoided.

In some embodiments, the process 64 further includes receiving a request from a user device for offers, as indicated by block 70. The request may specify criteria for identifying offers, such as categories of offers, search terms for offers, or requests for offers designated as favorites.

Next, the present embodiment includes identifying offers in the offer data store responsive to the user request, as indicated by block 72. Identifying offers in the offer data store may be performed by the above-mentioned controller 14 (FIG. 1) by constructing a query to the offer data store 60 based on a request received from the web server 18 or the API server 16. The query may be transmitted to the offer data store 60, or to the cache server 23, each of which may return responsive records.

Next, the identified offers are transmitted to the user device, as indicated by block 74. Transmitting the identified offers may include transmitting the identified offers in an offer interface, such as a webpage, or an API transmission to a native mobile application, for example by the web server 18, or the API server 16 of FIG. 1, respectively.

The device receiving the identified offers may, in response, perform a process described below with reference to FIG. 3 by which additional offers are requested or an offer is selected and a purchase is executed. This process of FIG. 3 and steps 70 through 74 of FIG. 2 may be repeated numerous times, in some use cases, before advancing to the next steps. Further, the steps 66 through 68 may be repeated numerous times independently of (e.g., concurrent with) the performance of steps 70 through 74 of FIG. 2 (which is not to suggest that other steps described herein may not also be executed independently). That is, the process 64 may undergo step 60 and 68, for example, 50 times within a given time, while performing steps 70 through 74 500 times within that given time, and performing the remaining steps of process 64 a single time.

Figure 3:
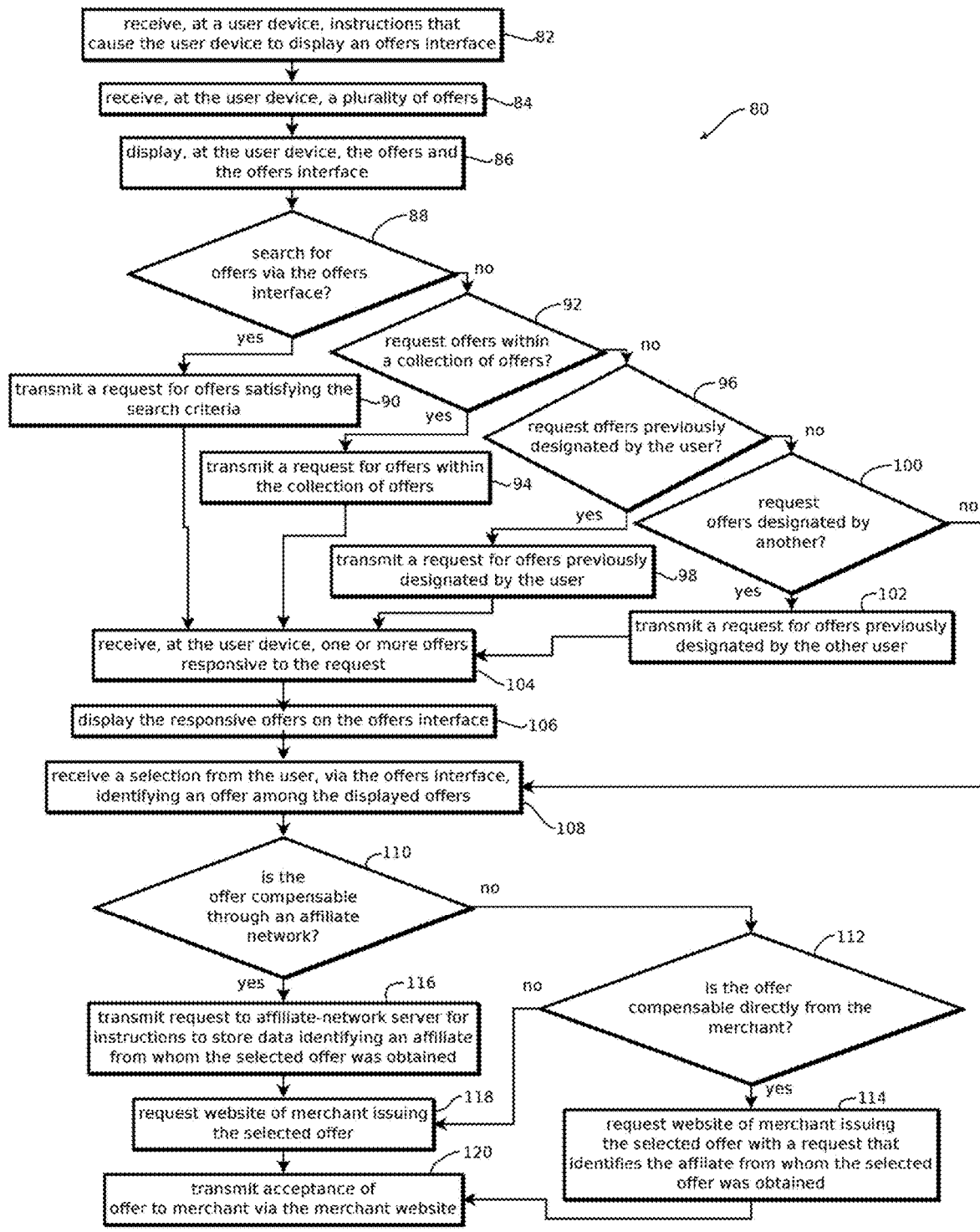
FIG. 3 illustrates an example of a process by which a user device in the offer-discovery system of FIG. 1, in some embodiments, obtains and presents to users data related to offers.

In some embodiments, a user device undergoing the process of FIG. 3 may indicate to an offers engine that the user has selected an offer (e.g., by clicking on or touching a selectable element in an offers interface associated with the offer). In response, the offers engine may direct the user device to an affiliate-network server or a merchant server associated with the offer, as illustrated by block 75.

Next, this embodiment of the process 64 includes receiving from merchants or affiliate networks transaction data identifying offers accepted via the user device, as illustrated by block 76. The transaction data may be pulled from these sources, for example, by the ingest module 20 of FIG. 1, periodically, or in response to some threshold number of transactions having occurred.

Next, in this embodiment, the receipt transaction data may be stored in an analytics data store, as indicated by block 78. In some embodiments, this data may be stored in the analytics data store 62 of FIG. 1. Storing the transaction data is expected to facilitate the identification of attributes of relatively profitable offers, as the transaction data indicates which offers historically yielded compensable transactions. Further, storing the transaction data is expected to facilitate relatively accurate auditing of payments from merchants or affiliate networks.

FIG. 3 is a flowchart of an embodiment of a process 80 that provides an example of an offer interface at a user device. The process 80 may be performed by the above-mentioned native application 52 or web browser 50 or 54 in cooperation with the offers engine 12.

Some embodiments of process 80 begin with receiving, at a user device, instructions that cause the user device to display an offers interface, as indicated by block 82. The received instructions may be in the form of a downloaded native application, such as one downloaded from an application store hosted by a provider of mobile devices, or the received instructions may be in the form of a website received from the offers engine 12 and rendered in a browser of the user device.

In some embodiments, the process 80 further includes receiving, at the user device, a plurality of offers, as indicated by block 84, and displaying, at the user device, the offers in the offer interface, as indicated by block 86. The offers may be received at approximately the same time the instructions of step 82 are received, for example along with a webpage, or the offers may be received at a later date, for example during a session subsequent to downloading the native application.

The offers interface may include inputs by which the user may search, filter, or otherwise browse offers having various attributes. Some of these interfaces are described below with reference to steps performed to determine whether the user has engaged these inputs. In some embodiments, determining whether the user has engaged these inputs may be performed by an event handler executed by the user device, the event handler causing the user device to perform the corresponding, below-described requests to the offers engine 12 based on the type of event, e.g., whether the user touched, clicked, or otherwise selected a particular button on the offers interface.

Illustrated process 80 includes determining whether the user is searching for offers, as indicated by block 88. With the offers interface, the user may express their intention to search for offers by entering search terms in a text entry box and selecting a button to request a search in accordance with the entered search term. Upon selecting this button, the user device may transmit a request for offers satisfying the entered search criteria, as indicated by block 90. The transmitted request may be in the form of a GET request or an API call to the web server 18 or the API server 16 of the offers engine 12 of FIG. 1.

In some embodiments, the process 80 further includes determining whether the user requests offers within a collection of offers, as indicated by block 92. The offers interface may include selectable inputs that identify the collections, such as clickable collection names, collection selection buttons, or collection selection tabs. Examples of collections include categories of goods or services, such as sporting goods, house-wares, groceries, and the like; collections of modes of coupon redemption, such as in-store coupon redemption and online coupon redemption; collections based on offer statistics, such as newest offers, most popular offers, highest ranked offers; collections of offers designated by a user or other users; or collections based the value conferred by the offer, such as discounts, free shipping, rebates, and referral fees. Upon determining that the user has requested offers within a collection, the user device may transmit a request for offers within the collection to the offers engine 12, as indicated by block 94, which may return data responsive to the request.

In some embodiments, the process 80 includes determining whether the user requests offers previously designated by the user, as indicated by block 96. In some embodiments, the offers interface may include an input by which a user can designate an offer, such as designating offers as being a user favorite, designating offers as being ranked in a particular fashion, or designating offers as likely being of interest to some other user, such as users adjacent one another in a social graph. The offers interface may include an input for a user to make designations, such as a user selectable input labeled "add to my favorites," or "add to my wallet," and an input for a user to request offers having a designation, such as a user selectable input labeled "view my favorites." or "view my wallet." Upon determining that the user made such a request, the process 80 includes transmitting a request for the offers previously designated by the user, as indicated by block 88. The transmission may be made to the offers engine 12, to the API server 16 or the web server 18, as described above with reference to FIG. 1, and may include an identification of the designation and the user.

The process 80, in some embodiments, further includes determining whether the user requests offers previously designated by another user, as indicated by block 100. The offers interface, in some embodiments, may include an input by which a user makes such a request, such as a user selectable input labeled "offers recommended by my friends." Upon determining that the user has made such a request, the process 80 transmits a request for offers previously designated by the other user (or users), as indicated by block 102. Again, the transmission may be to the offers engine 12 of FIG. 1, which may store or otherwise have access to offers designated by other users and a social graph of the user by which responsive offers are identified. Further, the offers interface may include an input by which the user may view identifiers of other users and add the other users to an offer-interest graph of the user. This offer interest graph may be referenced by the offers engine 12 to identify offers in response to the request of step 102.

The process 80 further includes, in some embodiments, receiving, at the user device, one or more offers responsive to the request, as indicated by block 104, and displaying the responsive offers on the offers interface, as indicated by block 106.

In some embodiments and some use cases, a selection from the user is received via the offers interface, thereby identifying an offer among the displayed offers, as indicated by block 108. In some embodiments, each of the offers may be displayed with an associated input by which the user selects the offer, such as a touchable or clickable button, region, or text. The selection, in some embodiments, may cause the offers interface to request additional data from the offers engine, such as instructions from the offers engine to navigate to an affiliate-network server associated with the offer or to navigate to a merchant server associated with the offer. In other embodiments, such instructions may be present within the offers interface, e.g., in the form of URLs linking to these servers.

The process 80 further includes determining whether the selected offer is compensable through an affiliate network, as indicated by block 110. This determination may be made by the offers engine 12, in some embodiments, for each of the offers being displayed prior to transmission of the offers to the user device. For example, each offer may be associated with a designation indicating whether the offer is compensable in this fashion, and the designation may be transmitted along with the offer, for instance, by associating the offer with HTML or JavaScript™ that so designate the offer, or by including a field including the designation in a response to an API call for each offer. The user device, in some embodiments, may take different actions depending on the designation associated with the selected offer.

Upon determining that the selected offer is not compensable through an affiliate network, the process 80 of this embodiment includes determining whether the selected offer is compensable directly from the merchant associated with the offer, as indicated by block 112. Again, the determination of block 112 may be performed, in some embodiments, by the offers engine 12 for each of the offers being displayed prior to transmission of the displayed offers, and each displayed offer may be associated with a designation based on the results of the determination, such as different HTML or JavaScript™ or a different field value in an API response. The user device may take different actions depending on this designation.

Upon determining that the selected offer is not compensable directly from the merchant, the process 80 may proceed to block 118 described below. Upon determining that the selected offer is compensable, the process 80, in this embodiment, may proceed to request the website of the merchant issuing the selected offer with a request that identifies the affiliate from whom the selected offer was obtained, as indicated by block 114. The request may be in the form of a URL having as a parameter an identifier of the entity operating the offer engine 12, thereby indicating to the merchant that the affiliate should be compensated in accordance with an arrangement between the merchant and the affiliate. Upon performance of step 114, the process 80 of the present embodiment proceeds to step 120 described below.

As indicated by block 110, upon determining that the selected offer is compensable through an affiliate network, the process 80 proceeds to transmit a request to the affiliate-network server for instructions to store data identifying an affiliate from whom the selected offer was obtained, as indicated by block 116. This request may be a request for content from the affiliate-network server that is not displayed to the user, or is not displayed to the user for an appreciable amount of time (e.g., less than 500 ms), and the request may include an identifier of the affiliate, the merchant, and the offer. The requested content may cause the user device to store in persistent memory of the browser of the user device (e.g., memory that lasts between sessions, such as a cookie or a database of the browser) an identifier of the affiliate operating the offers engine 12. This value may be retrieved later by the affiliate-network at the instruction of the merchant upon the user accepting the offer, for example by the user using a coupon code associated with the offer at the merchant, thereby allowing the merchant (or the affiliate network) to identify the appropriate party to compensate for the sale.

Upon transmitting the request the affiliate network server, the process 80 further includes requesting the website of the merchant issuing the selected offer, as indicated by block 118, and transmitting acceptance of the offer to the merchant via the merchant's website, as indicated by block 120. Accepting the offer, as noted above, may cause the merchant to compensate the affiliate operating the offers engine 12.

The process 80 of FIG. 3 is expected to facilitate relatively fast access to offers that are likely to be relevant to a user, as each of the determinations of step 88, 92, 96, and 100 provide different paths by which the user can specify offers in which the user is likely to be interested. Further, the determinations of step 110 and 112 provide dual mechanisms by which the operator of the offers engine 12 can be compensated, thereby potentially increasing revenue.

Figure 4:
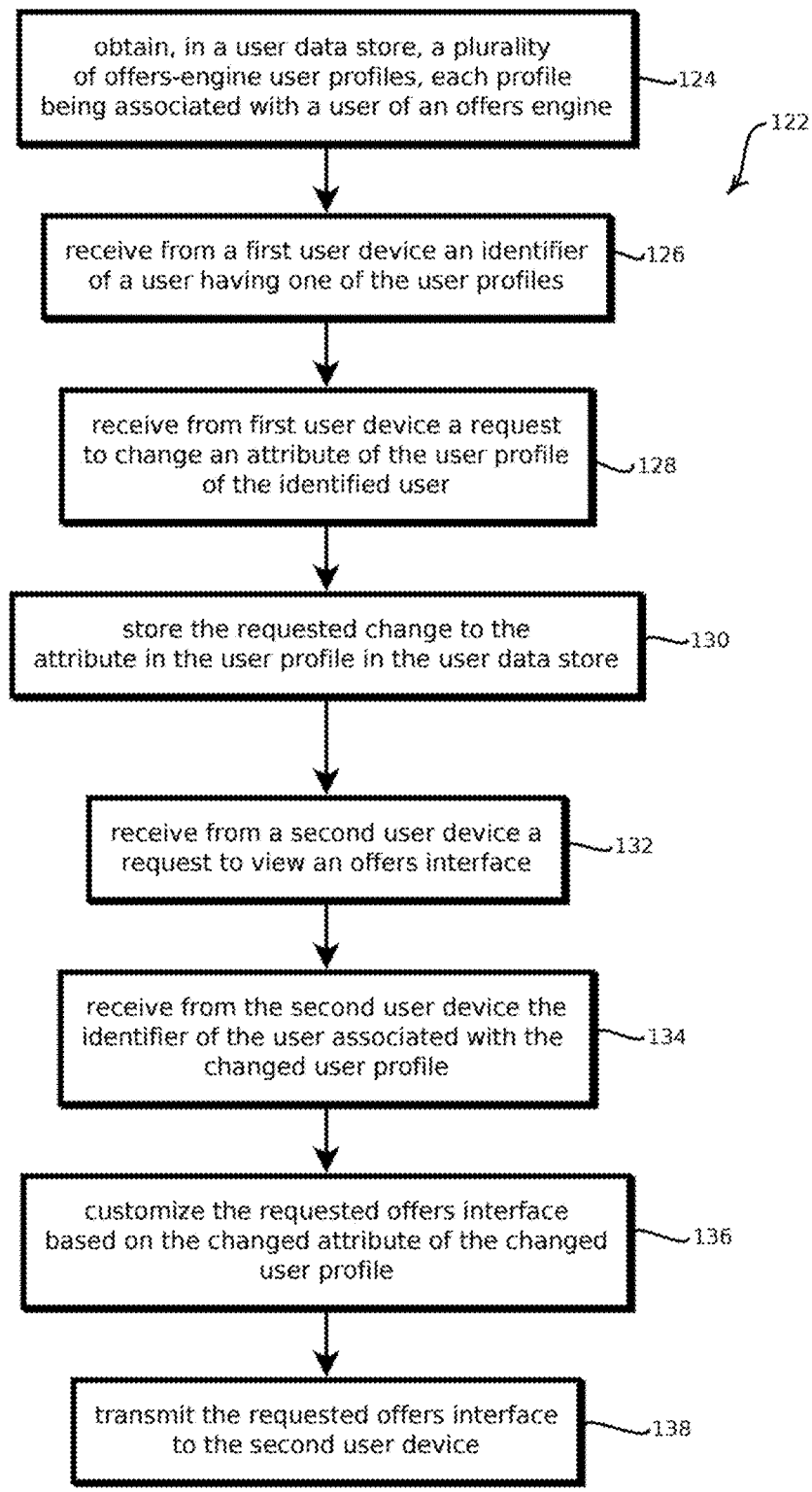
FIG. 4 illustrates an embodiment of a process by which a user's profile related to offers is made accessible across a variety of different user devices.

FIG. 4 illustrates an example of a process 122 by which a user's experience with the offer engine 12 can be made relatively consistent across multiple sessions and multiple devices. Often, users become aware of offers in one environment, using one device, such as at home on their desktop computer, and then desire to use or view the offer in another environment, using a different device, such as in a retail store, using their mobile phone. The process of FIG. 4 is expected to allow users to designate offers in a first session on a first device and view an offers interface constructed based on that designation in a second session on a second device, thereby allowing the user to leverage the work previously performed on the first device designating the offer.

The process 122, in this embodiment, includes obtaining, in a user data store, a plurality of offers-engine user profiles, as indicated by block 124. Each profile may be associated with a user of the offers engine, such as the offers engine 12 of FIG. 1. Examples of user profile records are described above with reference to the user data store 56 of FIG. 1. User profile data may be acquired, in part, via a user sign-up interface presented by the offers engine 12 on user devices. When interacting with some versions of this interface, the user creates a user identifier (e.g., a username), a user password, and provides information about their preferences for how the offers interface should be configured.

Next, the present embodiment of the process 122 includes receiving from a first user device an identifier of a user having one of the user profiles, as indicated by block 126. The identifier may be obtained by transmitting to the user device an interface by which the user logs in to the offers engine 12 by entering a user identifier and a password and receiving this data, or the identifier may be obtained by transmitting a request to the user device for an identifier stored in persistent browser memory or memory of a native application, e.g., by retrieving a value stored in a cookie, a local Storage object, or a SQLite database, and receiving this data.

Next, in some embodiments, the process 122 includes receiving from the first user device a request to change an attribute of the user profile of the identified user, as indicated by block 128. The change may be a change to the above-described fields of user profile records stored in the user data store 56 of FIG. 1, including additions, subtractions, and modifications. The request may be received via a call to the API server 16 or the web server 18 of FIG. 1, for example.

The present embodiment further includes storing the requested change to the attribute in the user profile in the user data store, as indicated by block 130. In some embodiments, the updated record may be propagated to a version of the record mirrored in a cache server.

Next, the illustrated process 122 includes receiving from a second user device a request to view an offers interface (e.g., a web page or data for display within a native application), as indicated by block 132. The second user device may be a different user device from the first user device and may be a different kind of user device. For example, the first user device may be a desktop or laptop computer, and the second user device may be a mobile user device, such as a smart phone executing a native application or a web browser requesting the offers interface.

The process 122 of this embodiment further includes receiving from the second user device the identifier of the user associated with the changed user profile, as illustrated by block 134. The received identifier may be received via one of the mechanisms described above with reference to step 126.

In this embodiment, the process 136 further includes customizing (e.g., personalizing) the requested offers interface based on the changed attribute of the changed user profile, as indicated by block 136. The customized offers interface may be the initial interface presented to the user on the second user device, or an interface to which the user navigates on the second user device. For example, the interface displaying the user's favorites or favorites of the user's friends among the available offers may be displayed upon a user requesting such an interface customized based on their previous entries. In some embodiments, the modified attribute or attributes may include location preferences, life events (e.g., getting married or going to college), store preferences, category preferences, previous purchases, and redemption preferences, and the offers interface may be customized base on these modified attributes to present offers likely to be of interest to the user.

The offers interface may be customized based on a variety of inputs. For instance, the offers engine may (i) track a user's navigation history, access history, and coupon-use history data on one or more devices and (ii) present the user with customized offers interface based on such data. Activity by the user on one or more devices may be correlated based on a user identifier, such as a user login, or based on IP address. As a user views, saves as favorites, shares, redeems, or otherwise interacts with offers, such activities may cause the user device to send data indicative of such actions (e.g., GET requests for responsive data to the offers engine, or data indicative of redemptions or click-throughs gathered by an affiliate network or merchant), and based on this data, the offers engine may update the user profile.

For example, a user may redeem coupons in a particular category of goods or services (e.g., sporting goods, or restaurants) at a higher rate than other categories and, in response, an offers interface may be customized with offers selected based on these redemptions, elevating offers in the favored category in a ranked list of candidate offers to present to the user, thereby making those offers more likely to be presented to the user. Similarly, offers may be up-ranked based on previous user selections of offers, sharing of offers, designating offers as favorites, etc. And offers deemed to be similar to those offers with which the user interacted may be selected for a higher ranking than they would otherwise receive, for instance, by up-ranking or selecting offers from the same store, offers in the same category of goods or services, offers having the same form of redemption (e.g., online or in-store), or offers having the same form of savings (e.g., discounted shipping, a percentage discount, a volume discount, or the like), as those offers with which the user previously interacted, interacted with at greater than a threshold rate, or interacted with more than other categories. In some cases, the user may explicitly designate for the offers engine criteria by which offers are to be ranked, indicating for instance, that online-offers in the category of pet-supplies including the keyword "dog" should receive an elevated ranking, and these criteria may be stored in the profile of the user.

Alternatively or additionally, in some embodiments, offers may be selected for presentation in a customized offers interface based on locations of the offers and a location of the user, e.g., as indicated by a location sensor on a mobile user device (and conveyed in a request for offers) or as recorded in a user profile based on a location entered by the user, based on a geocoded IP address of the user stored in the profile, or based on a bounding area containing geolocations of offers previously redeemed by the user, such as a metropolitan area in which the user has redeemed more offers than other metropolitan areas, for instance. In some embodiments, offers are geocoded, e.g., based on an address of a merchant, or addresses of store locations of a chain-store merchant, and offers are ranked based on distances between the location of the user and the location associated with the merchant (e.g., based on the nearest store of a chain), elevating in a ranking those offers that are closer to the user and making closer offers more likely to be presented in the customized interface. In some cases, location-based ranking is combined with the other forms of ranking discussed above to select offers to present in a customized interface. The ranking of offers for presentation may also be based, in combination with the other factors described herein, on non-personalized factors, e.g., the age of an offer, a reported success rate of an offer as reported by other users, or the amount of savings presented by an offer.

In this embodiment, the process 122 includes transmitting the requested offers interface to the second user device, as indicated by block 138. Modifying the transmitted offers interface based on previous user interactions with the offers engine is expected to allow the user to leverage earlier work locating offers and facilitate relatively easy subsequent access to relevant offers.

Figure 5A:
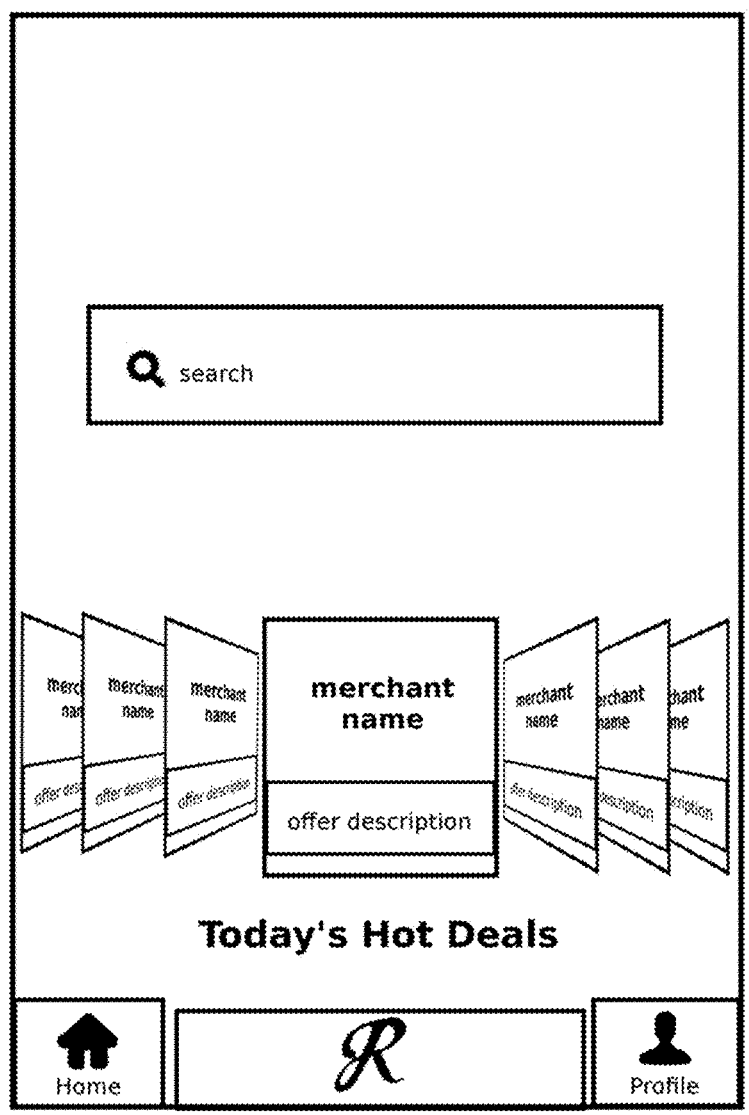
FIGS. 5 A-L are examples of an offers interface presented by a native application on a mobile user device display screen.
Figure 5B:
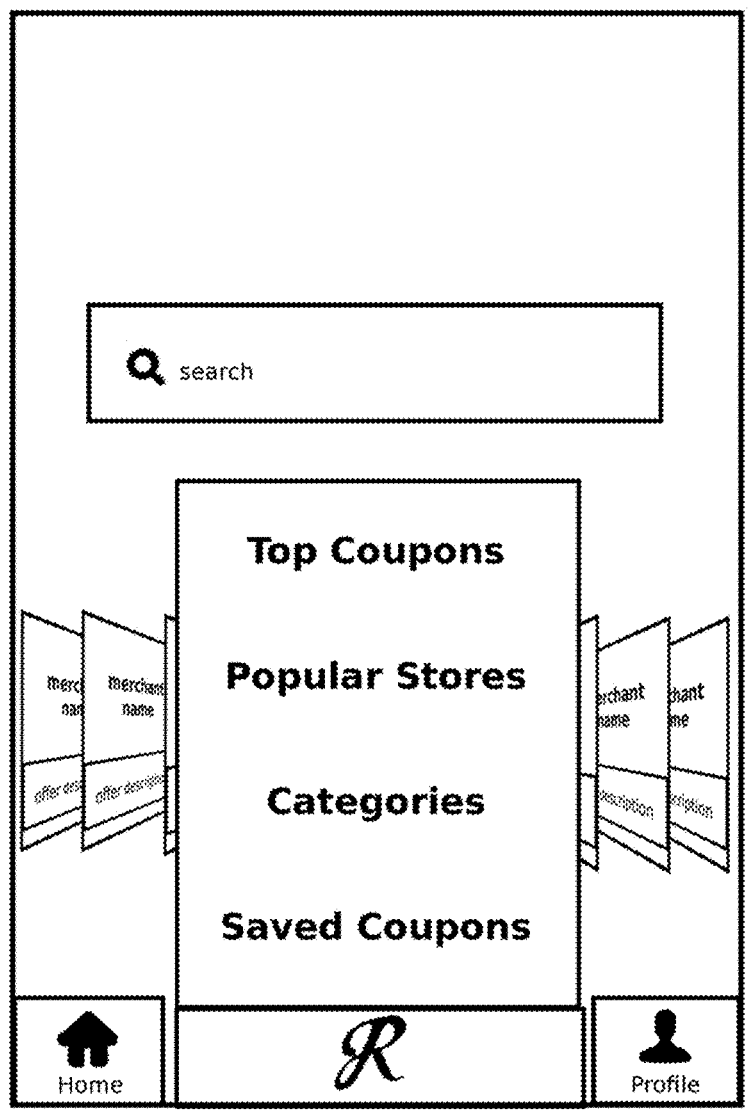
Figure 5C:
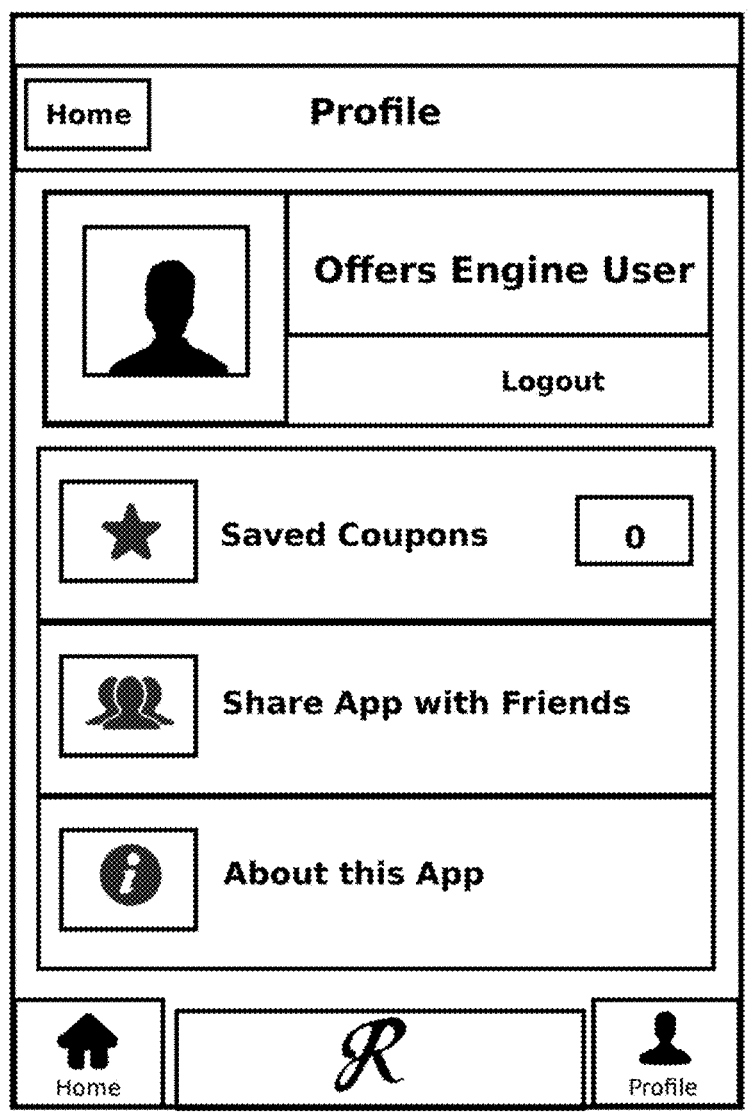
Figure 5D:
Figure 5E:
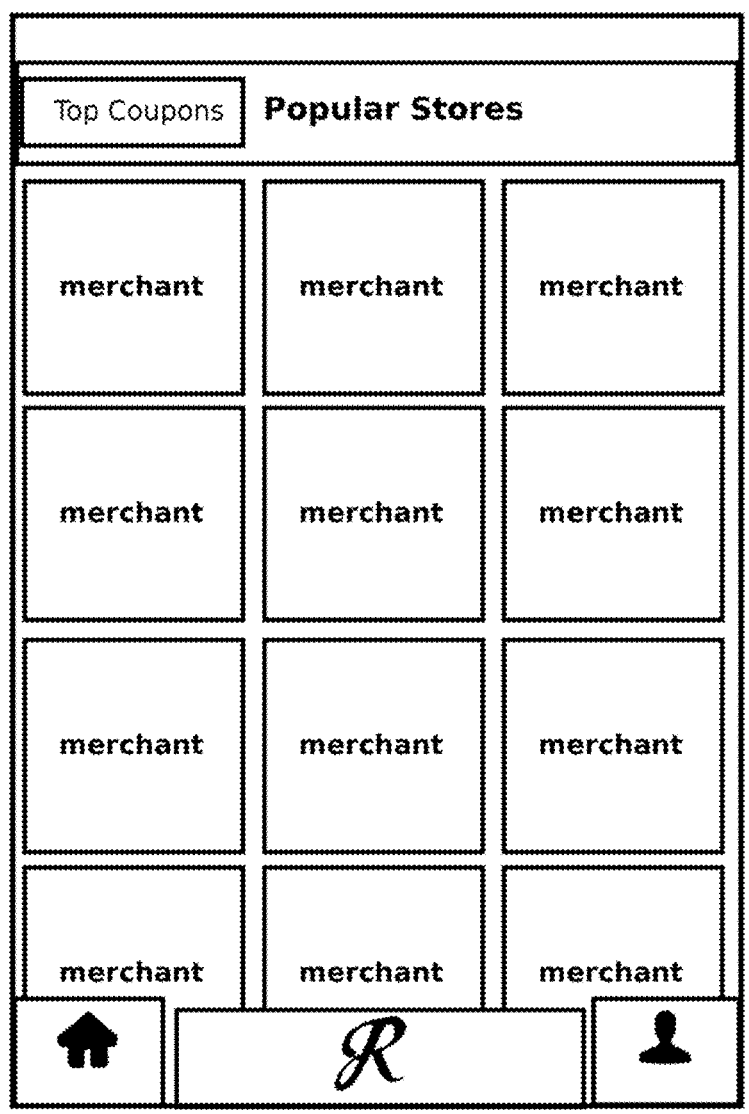
Figure 5F:
Figure 5G:

FIGS. 5A-L illustrate examples of an offers interface in a native application on a mobile device. FIG. 5A illustrates an initial view (e.g., interface) presented by the application, and FIG. 5B illustrates a menu, items of which are described below, displayed in response to a user selecting (touching or clicking, for example) the input labeled "R" in FIG. 5A. FIG. 5A further includes a search interface labeled "search," by which a user may search for offers issued by particular merchants. Upon selecting the menu option labeled "profile" of FIG. 5A, the screen of FIG. 5C may be displayed. The illustrated field "saved coupons" of FIG. 5C may be a designation that is customized across multiple user devices in accordance with the process of FIG. 4. As described above, a user may save offers at home on a web-based interface using a desktop computer, causing those offers to be displayed (e.g., as shown in FIG. 5G, described below) when the "saved coupons" button is selected in a native application on their mobile device. And offers saved in the native application on the mobile device may be viewable on the web-based interface presented on the desktop computer. Thus, some embodiments present the same set of saved offers across multiple devices. The saved offers may be presented in the fashion described below, either in displayed lists or as individual in-store or on-line offers.

Upon selecting the menu option labeled "top coupons" of FIG. 5B, the screen of FIG. 5D may be displayed, thereby requesting and displaying offers within the corresponding category of "top coupons." The display of FIG. 5D includes inputs labeled "online" and "in store" by which users may request offers in those respective categories within the category of "top coupons," thereby allowing the user to request coupons that are present in two overlapping categories (e.g., the overlap of the "top coupons" and "online" categories). In other embodiments, users may request offers in other categories, such as, for example, "deals," "sales," "free shipping," "new," "codes," "shared," and the like. The interface of FIG. 5D further includes an input labeled "popular stores" that is labeled in accordance with the previous view depicted (and also reachable via the similarly labeled input of FIG. 5B) and by which the user may navigate back to a previous view, in this case a view of offers within the category of "popular stores."

The interface of FIG. 5D, and other similar interfaces described below, may include a scrollable list of offers, each offer being depicted in a selectable region of the interface and including an image, a description, and an indicator of the rate at which other users have successfully used the offer, e.g., based on user feedback. Similarly, the interface of FIG. 5A may include a scrollable (e.g., horizontally or vertically) interface capable of performing perspective transforms on selectable icons by which a user may search for offers associated with particular merchants.

Upon selecting the menu option labeled "popular stores" in FIG. 5B, the view of FIG. 5E is presented, which includes a matrix of user selectable icons for requesting offers (e.g., requesting from the offers engine above and displaying) within categories corresponding to particular merchants.

Upon selecting the menu option labeled "top categories" in FIG. 5B, the view of FIG. 5F is presented, which includes a matrix of user selectable icons for requesting offers within categories corresponding to related goods and services, e.g., electronics, automotive, food, etc.

Upon selecting the menu option labeled "saved coupons" in FIG. 5B or 5C, the view of FIG. 5G is presented, which includes a list of user selectable areas for requesting offers previously designated by a user, a list which the process of FIG. 4 may make consistent across multiple user devices. The interface of FIG. 5G also includes inputs for faceting the designated offers according to whether the offers fall within particular categories, such as, in this embodiment, "in store" redeemable coupons or "online" redeemable coupons.

Figure 5H:
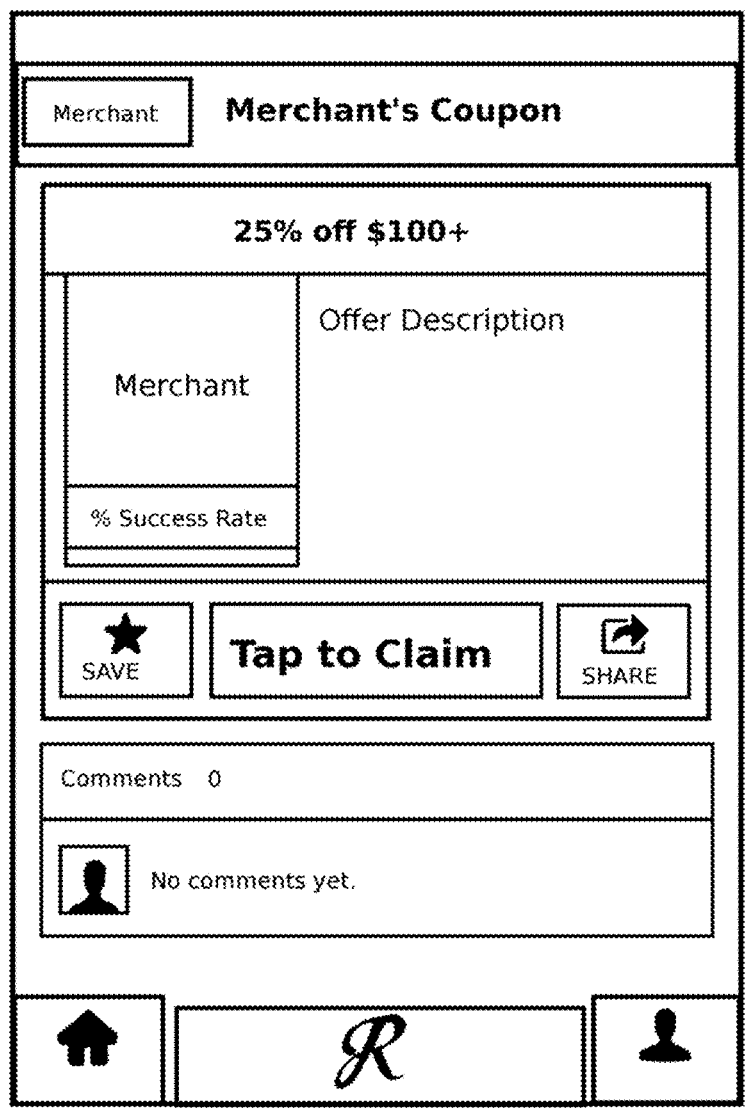
Figure 5I:

Upon selecting a displayed offer within the various listings of offers presented, if the offer includes a coupon redeemable in-store (e.g., with the user physically present at the point of sale in the retail store), an interface similar to that of FIG. 5H may be displayed. Selecting the input labeled "save" in FIG. 5H may cause the users profile to be updated to include a designation of the associated offer as being a favorite, and selection the option labeled "share" may cause the offers engine 12 or the user device to transmit information about the offer to third party servers, e.g., social networks, email, sms, or other services by which users communicate with one another. Selecting the option labeled "tap to claim" in FIG. 5H may cause the user device to display the view depicted by FIG. 5I, which includes an image (or other remotely senseable transmission) by which a coupon may be redeemed in-store, including a bar code that, in some embodiments, identifies the affiliate so that the affiliate can be compensated by the merchant.

In some embodiments, a user may be prompted to answer whether the coupon was successfully redeemed. In some embodiments, a user may be prompted to answer with the amount of savings that were realized from redemption of a coupon. In some embodiments, a user may be prompted after a set amount of time after claiming the coupon or upon the occurrence of a user triggered event, such as an attempt to change the view displayed on the user device or a movement of the device by a rapid shaking motion (e.g., faster than 2 hertz).

Figure 5J:
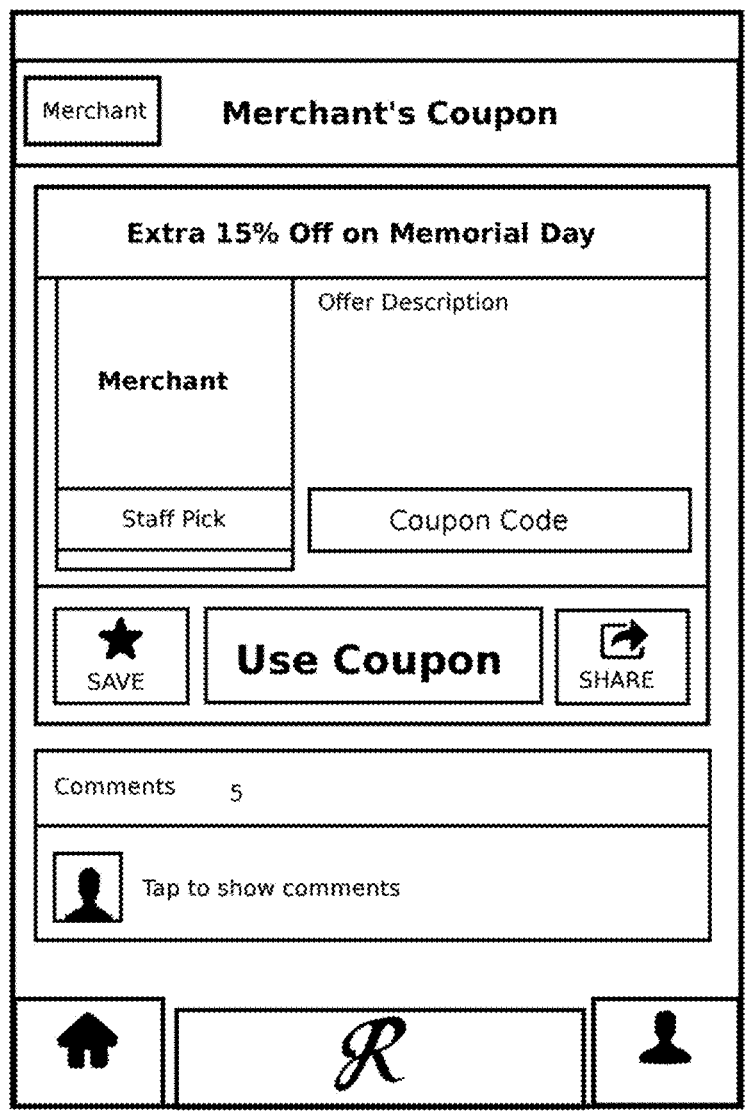

Upon selecting a displayed offer within the various listings of offers presented, if the offer includes a coupon redeemable online (e.g., with a coupon code, such as a 20-character or shorter human-readable string that is readily remembered by the user), an interface similar to that of FIG. 5J may be displayed. The inputs labeled "share" and "save" of FIG. 5J have a similar (or the same) functionality as the corresponding inputs of FIG. 5H. FIG. 5H may be presented if (e.g., if and only if) the offer is associated with a coupon code, upon selection of an offer by a user. The associated coupon code is depicted generically in FIG. 5J as the string "coupon code" in this example, along with an offer description, which may indicate when the coupon expires, for example, and with a "staff pick" designation entered via the administrator module of the offers engine 12. Selecting the input labeled "use coupon" of FIG. 5J may instantiate a browser on the mobile device, and initiate one of the processes described above for documenting that the affiliate should be compensated (e.g., if the user accepts the offer) and directing the browser to the merchant's website. FIGS. 5H and 5J may also include an input labeled "comments" by which the user can view comments associated with the offer made by other users or add their own comment.

Figure 5K:

Alternatively, upon selecting a displayed offer within the various listings of offers presented, if the offer includes a coupon redeemable online, and if the offer does not have a coupon code, the view depicted in FIG. 5K may be displayed. The inputs of FIG. 5K that are labeled the same as those in FIG. 5J may have the same or similar functionality. The offer may be claimed by the user selecting the input labeled "tap to claim," which may initiate the process described above for documenting that the affiliate should be compensated (e.g., if the user accepts the offer) and directing the browser to the merchant's website.

Figure 5L:
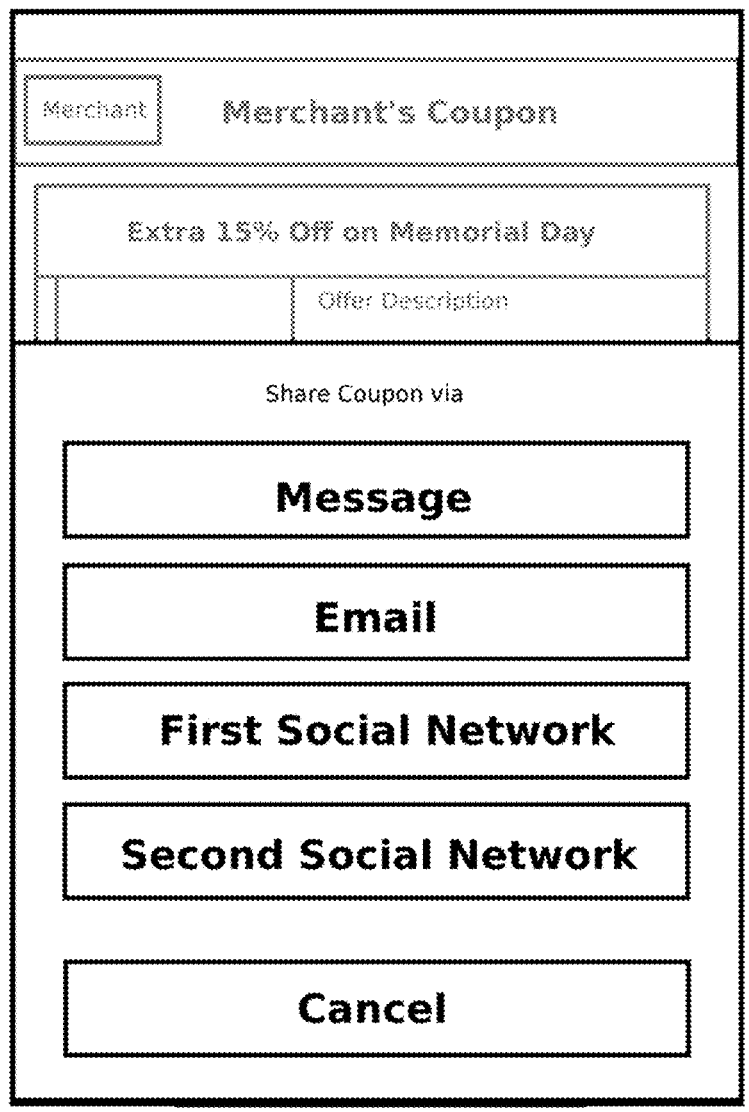

Upon selecting the above-mentioned inputs labeled "share," the view depicted in FIG. 5L may be displayed. This view includes a list of inputs by which the user may designate a service for sharing information about an offer, e.g., to recommend the offer to friends or adjacent members of a social graph or email or sms contacts (e.g., contacts stored on the mobile user device).

Some embodiments include other interfaces for presentation on the user's devices, e.g., a mobile web interface for presentation within a browser on a mobile device and a website for presentation on a full-sized screen (e.g., greater than or equal to 1024×768 pixels). As noted above, interfaces presented on these other interfaces may reflect changes entered using the interfaces of FIGS. 5A-L and vice versa, thereby allowing the user to leverage previous efforts to identify relevant offers in different environments on different devices.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms relating to causal relationships, e.g., "in response to," "upon," "when," and the like, encompass causal relationships having both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A method performed by a programmed processor of a server system to expedite cross-device interactions, the method comprising:
    storing a user profile in a user datastore that stores a plurality of user profiles, each for a different user, the user profile having attributes associated with a user of a plurality of related client computing devices;
    receiving, over a computer network and from a first client computing device of the plurality of related client computing devices, a request to change an attribute of the user profile;
    in response to receiving the request, changing the attribute in the user profile stored in the user datastore, the changed attribute identifying an offer that is stored in an offers datastore that stores a plurality of offers, the offer is also stored in a cache server that maintains a cache of offers in random access memory, the cache of offers are a subset of offers stored in the offers datastore,
    wherein the cached offers in the cache server are associated with respective hash key values by the cache server that are associated with respective addresses at which the respective offers can be accessed in the random access memory, and each of the hash key values is based on one or more respective attributes of the respective offer;
    receiving, over the network, after the request and from a second client computing device, a request to access a customized interface for display on the second client computing device;
    determining that the second client computing device is one of the plurality of related client computing devices;
    in response to determining that the second client computing device is one of the plurality of related client computing devices:
        accessing the changed attribute in the user profile;
        determining a hash key value based on the changed attribute;
        accessing the offer in the cache of offers at an address in the random access memory based on the determined hash key value;
        using the accessed offer to select one or more offers among the plurality of offers, wherein the selected one or more offers includes at least the offer accessed from the cache server; and
        transmitting, over the network, the selected one or more offers to the second client computing device for the customized interface to be displayed on the second client computing device, wherein the selecting of offers for display in the customized interface is based upon a bounding area containing geolocations of offers previously redeemed and on distances between the user and a location of a merchant associated with at least one of the plurality of offers.

2. The method of claim 1,
    wherein the hash key value is a first hash key value,
        wherein the cache server comprises 1) a first hash table that associates the first hash key value with the address at which the offer is accessed and 2) a second hash table that associates a second hash key value with the address at which the offer is accessed,
        wherein the second hash key value is different from the first hash key value, and
        wherein the second hash key value is based on a different attribute of the user profile from the changed attribute.

3. The method of claim 1, wherein the offer is a first offer, wherein the method further comprises:
    updating a first copy of a second offer stored in persistent storage of the offers datastore, the persistent storage being a different type of memory from the random access memory;
    after updating the first copy, accessing a second copy of the second offer stored in the cache server to service a request from a third client computing device among the plurality of related client computing devices; and
    after servicing the request from the third client computing device, updating the second copy stored in the cache server to match the first copy, such that inconsistent data relative to the update is used to service the request from the third client computing device.

4. The method of claim 1 further comprising determining which offers stored in the offers datastores to mirror in the cache server based on amounts of time elapsed since the offers stored in the offers datastore were last accessed, wherein the offers datastore comprises more than 1,000 offers.

5. The method of claim 1 further comprising determining which offers stored in the offers datastore to mirror in the cache server based on frequency of access.

6. The method of claim 1 further comprising determining which offers stored in the offers datastore to mirror in the cache server based on age of the offers.

7. The method of claim 1, wherein the user profile comprises an OAuth access token credential and an expiration time of the credential.

8. The method of claim 1, wherein the attribute is a category identifier that identifies a category of goods or services, wherein one or more offers in the offers datastore have the category identifier.

9. The method of claim 1, wherein a plurality of offers are accessed at respective addresses associated with the determined hash key value by the cache server.

10. The method of claim 1, wherein the request to change the attribute is received during a first session and the request to access the interface is received during a second session that is subsequent to the first session.

11. The method of claim 10, wherein determining that the second client computing device is one of the plurality of related client computing devices comprises receiving, over the network and during the second session, an identifier of the user profile that distinguishes the user profile from other user profiles in the user datastore.

12. The method of claim 11 further comprising transmitting, over the computer network, a request to the second client computing device for the identifier of the user profile from persistent browser memory of the second client computing device.

13. The method of claim 11, wherein the identifier is from a native application executing by the second client computing device, the second client computing device being a smart phone.

14. The method of claim 1, wherein the attribute is one of a location preference, store preference, category preference, one or more purchases, and a redemption preference.

15. The method of claim 1, wherein the one or more offers are offers that are most likely to be of interest to a user of the plurality of related client computing devices of the plurality of offers stored in the offers datastore, wherein the method further comprises customizing the interface to include the one or more offers when displayed on the second client computing device.

16. The method of claim 1, wherein the interface is consistent by including the same selected one or more offers across multiple sessions and multiple related client computing devices.

17. The method of claim 1 further comprising:
receiving, over the computer network, data of a set of one or more offers from one or more sources that are associated with the set of one or more offers; and
storing the data in the offers datastore.

18. The method of claim 1,
wherein the user profile comprises a plurality of attributes that includes the changed attribute and are associated with a customization of the interface, the plurality of attributes including a collection of favorite offers previously identified by a corresponding user, the offers interface being configured to provide a plurality of merchant offers displayed concurrently,
wherein the request to change the attribute causes a modification of the collection of favorite offers by adding a given offer.

19. The method of claim 18,
wherein the offers datastore stores more than 10,000 different offers and at least some of the more than 10,000 offers are stored in a sorted list of offers,
wherein receiving the request to access the interface comprises receiving a representational-state-transfer request to access the interface.

20. The method of claim 18, wherein the offer is accessible via a plurality of hash tables, each facilitating access to the offer via a different attribute of the offer.

21. The method of claim 18 further comprising, before changing the attribute of the user profile:
obtaining a geolocation of a user of the user profile and a given merchant specified by the user;
selecting a plurality of local offers redeemable with the given merchant based on a correspondence between the geolocation of the user and geolocations associated with the offers; and
sending the plurality of local offers to the first client computing device to be displayed in a user interface having an event handler operative to detect user interaction with a given one of the local offers and send a request to add the given one of the local offers to a list of favorite offers, wherein the changing comprises adding the given merchant to a list of favorite merchants of the user in the user profile, wherein the selected one or more offers are of the given merchant identified as favorites.

22. The method of claim 18, wherein transmitting the selected one or more offers comprises sending a machine-readable image encoding an identifier of the offer.

23. The method of claim 18, wherein the selected one or more offers comprises a plurality of offers redeemable in-store at a merchant based on a user submitted preference for the merchant, a geolocation of the user, and the user identifying the plurality of sent offers as favorites.

24. The method of claim 18, wherein the offer is a first offer, wherein the method further, comprises:
determining that a second offer stored by the cache server has not been accessed within a threshold duration or determining that the second offer stored in the cache server has not been accessed within a threshold frequency or duration; and
in response to the determination regarding access to the second offer, removing the second offer from the cache server, wherein the second offer is stored in the offers datastore both before and after removing the second offer from the cache server.

25. The method of claim 1, wherein each of the plurality of related client computing devices are related through a username of the user.

26. A non-transitory machine readable medium storing instructions that when executed by one or more processors by a server system to:
store a user profile in a user datastore that stores a plurality of user profiles, each for a different user, the user profile having attributes associated with a user of a plurality of related client computing devices;
receive, over a computer network and from a first client computing device of the plurality of related client computing devices, a request to change an attribute of the user profile;
in response to receiving the request, change the attribute in the user profile stored in the user datastore, the changed attribute identifying an offer that is stored in an offers datastore that stores a plurality of offers, the offer is also stored in a cache server that maintains a cache of offers in random access memory, the cache of offers are a subset of offers stored in the offers datastore,
wherein the cached offers in the cache server are associated with respective hash key values by the cache server that are associated with respective addresses at which the respective offers can be accessed in the random access memory, and each of the hash key values is based on one or more respective attributes of the respective offer;
receive, over the network, after the request and from a second client computing device, a request to access a customized interface for display on the second client computing device;
determine that the second client computing device is one of the plurality of related client computing devices;
in response to determining that the second client computing device is one of the plurality of related client computing devices:
access the changed attribute in the user profile;
determine a hash key value based on the changed attribute;
access the offer in the cache of offers at an address in the random access memory based on the determined hash key value;

use the accessed offer to select one or more offers among the plurality of offers, wherein the selected one or more offers includes at least the offer accessed from the cache server; and transmit, over the network, the selected one or more offers to the second client computing device for the interface to be displayed on the second client computing device, wherein the selecting of offers for display in the customized interface is based upon a bounding area containing geolocations of offers previously redeemed and on distances between the user and a location of a merchant associated with at least one of the plurality of offers.

\* \* \* \* \*